(12) United States Patent
Walther et al.

(10) Patent No.: US 9,377,068 B2
(45) Date of Patent: Jun. 28, 2016

(54) BRAKE LINING FOR A PISTON-ACTUATED DISC BRAKE OF A RAIL VEHICLE OR A UTILITY VEHICLE

(71) Applicant: KNORR-BREMSE SYSTEME FÜR SCHIENENFAHRZEUGE GMBH, Munich (DE)

(72) Inventors: Florian Walther, Munich (DE); Christian Mosbach, Alling (DE); Martin Waldstein, Munich (DE)

(73) Assignee: KNORR-BREMSE SYSTEME FUR SCHIENENFAHRZEUGE GMBH, Munich (DE)

( * ) Notice: Subject to any disclaimer, the term of this patent is extended or adjusted under 35 U.S.C. 154(b) by 0 days.

(21) Appl. No.: 14/382,149

(22) PCT Filed: Feb. 28, 2013

(86) PCT No.: PCT/EP2013/053987
§ 371 (c)(1),
(2) Date: Aug. 29, 2014

(87) PCT Pub. No.: WO2013/127892
PCT Pub. Date: Sep. 6, 2013

(65) Prior Publication Data
US 2015/0300431 A1 Oct. 22, 2015

(30) Foreign Application Priority Data
Mar. 2, 2012 (DE) .......................... 10 2012 004 606

(51) Int. Cl.
*F16D 65/092* (2006.01)

(52) U.S. Cl.
CPC .................................... *F16D 65/092* (2013.01)

(58) Field of Classification Search
CPC ..... F16D 65/092; F16D 2055/007; F16D 55/227
USPC ...... 188/251 R, 252, 253, 257, 250 G, 250 D, 188/261
See application file for complete search history.

(56) References Cited

U.S. PATENT DOCUMENTS 3,486,589 A * 12/1969 Hillegass ............ F16D 65/0979
188/244
3,964,580 A * 6/1976 Hahm ................... F16D 65/092
188/250 G (Continued)

FOREIGN PATENT DOCUMENTS

CN 101033783 A 9/2007
CN 101806329 A 8/2010

(Continued)

OTHER PUBLICATIONS

Search Report for International Patent Application No. PCT/EP2013/053987; May 28, 2013.

(Continued)

*Primary Examiner* — Thomas Irvin
(74) *Attorney, Agent, or Firm* — Barnes & Thornburg LLP

(57) ABSTRACT

A brake lining for a disc brake of a rail vehicle or utility vehicle with a lining plate carrier and a friction lining fastened thereon designed such that at least one reinforcing rib having a greater thickness than the adjacent region is provided at least on that side of the lining carrier plate which faces the friction lining.

7 Claims, 1 Drawing Sheet

(56) References Cited

U.S. PATENT DOCUMENTS

| | | | | |
|---|---|---|---|---|
| 4,085,828 | A | * | 4/1978 | Thioux ................. F16D 55/227 |
| | | | | 188/264 AA |
| 4,333,550 | A | * | 6/1982 | Shirai ..................... F16D 55/22 |
| | | | | 188/72.2 |
| 7,051,847 | B2 | * | 5/2006 | Wirth .................... F16D 65/092 |
| | | | | 188/250 B |
| 7,258,210 | B2 | * | 8/2007 | Gripemark ............ F16D 65/092 |
| | | | | 188/18 A |
| 7,316,301 | B2 | * | 1/2008 | Roberts ................... F16D 55/28 |
| | | | | 188/250 B |
| 2002/0000349 | A1 | | 1/2002 | Brecht et al. |
| 2006/0175161 | A1 | * | 8/2006 | Gripemark ............ F16D 65/092 |
| | | | | 188/218 XL |
| 2007/0175711 | A1 | | 8/2007 | Gripemark |
| 2008/0135350 | A1 | * | 6/2008 | Gripemark ............ F16D 55/225 |
| | | | | 188/73.31 |

FOREIGN PATENT DOCUMENTS

| | | |
|---|---|---|
| CN | 101821527 A | 9/2010 |
| CN | 102119289 A | 7/2011 |
| DE | 20017539 U1 | 1/2001 |
| DE | 102009034858 A1 | 3/2011 |
| EP | 1930616 A1 | 6/2008 |
| FR | 2521241 A1 | 8/1983 |
| WO | 2010128133 A1 | 11/2010 |

OTHER PUBLICATIONS

Notification Concerning Transmittal of International Preliminary Report on Patentability and Written Opinion of the International Search Authority for International Patent Application No. PCT/EP2013/053987, dated Feb. 28, 2013.

English Translation of Notification Concerning Transmittal of International Preliminary Report on Patentability and Written Opinion of the International Search Authority for International Patent Application No. PCT/EP2013/053987, dated Feb. 28, 2013.

Chinese Office Action for Application No. 201380012096.7, dated Dec. 2, 2015.

* cited by examiner

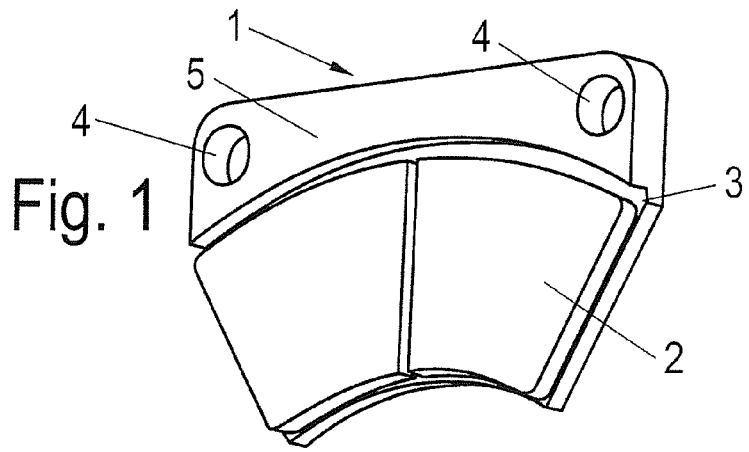
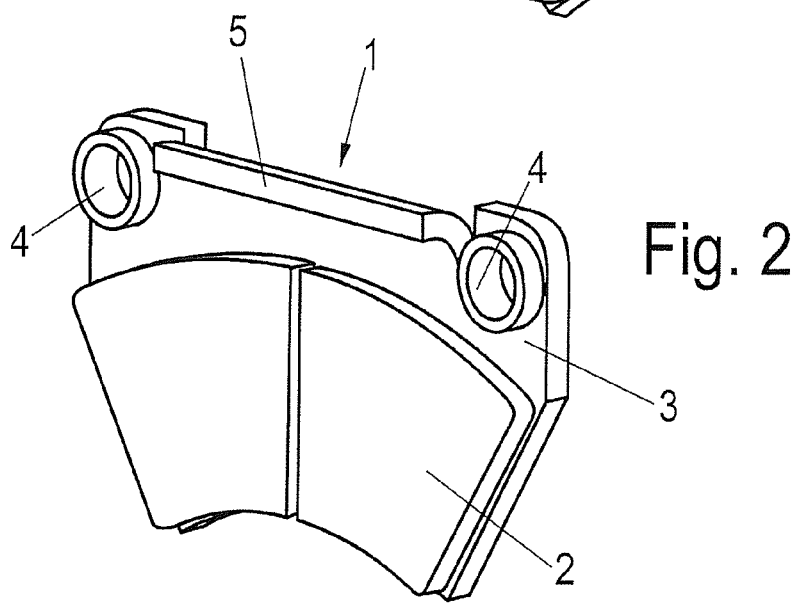
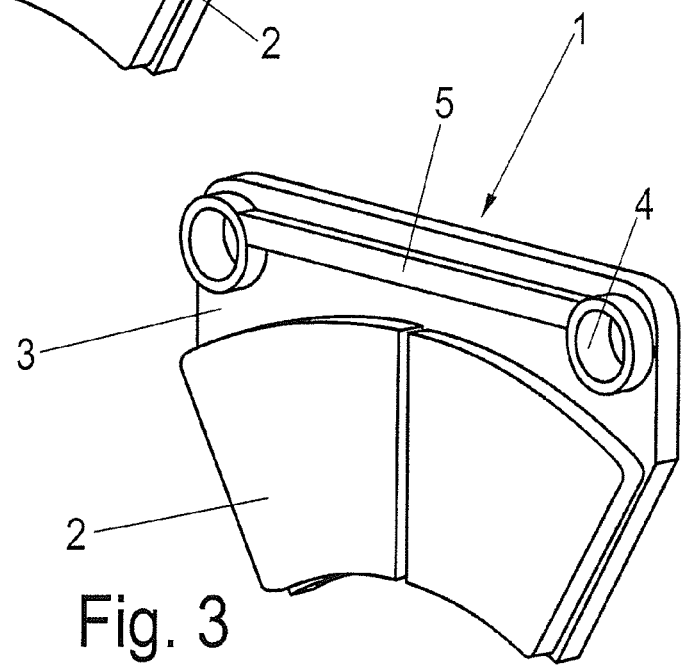

BRAKE LINING FOR A PISTON-ACTUATED DISC BRAKE OF A RAIL VEHICLE OR A UTILITY VEHICLE

PRIORITY CLAIM

This patent application is a U.S. National Phase of International Patent Application No. PCT/EP2013/053987, filed 28 Feb. 2013, which claims priority to German Patent Application No. 10 2012 004 606.5, filed 2 Mar. 2012, the disclosures of which are incorporated herein by reference in their entirety.

FIELD

Disclosed embodiments relate to a brake lining for a piston-actuated disk brake of a rail vehicle or a utility vehicle, having a lining carrier plate and a friction lining which is fastened thereon.

SUMMARY

Disclosed embodiments provide a brake lining of the generic type in such a way that its service life is increased and the operating reliability is improved. In this way, a brake lining is produced with an optimized volume with regard to the friction lining and optimized loading with regard to the lining carrier plate.

BRIEF DESCRIPTION OF THE FIGURES

In the following text, exemplary embodiments will be described using the appended drawings, in which:

FIG. 1 shows one exemplary embodiment of a brake lining in a perspective view;

FIG. 2 shows another exemplary embodiment of a brake lining in a perspective view; and FIG. 3 shows yet another exemplary embodiment of a brake lining in a perspective view.

The figures in each case show a brake lining for a piston-actuated disk brake of a rail or utility vehicle, which brake lining is provided overall with the designation 1.

DETAILED DESCRIPTION OF THE DISCLOSED EMBODIMENTS

Disclosed embodiments relate to a brake lining for a piston-actuated disk brake of a rail vehicle or a utility vehicle, having a lining carrier plate and a friction lining which is fastened thereon.

In addition to securing the friction lining, the lining carrier plate of a brake lining of this type also serves to transmit the braking forces, as a result of which the lining carrier plate is subjected to particular loading.

In particular, in the case of disk brakes with brake caliper actuation, non-uniform wear of the friction lining often occurs with the risk of the lining carrier plate bending.

This can in turn result in a reduction in the required air play, that is to say the spacing between the friction lining and a brake disk, with the consequence that the friction lining bears continuously against the brake disk with increased wear up to overheating of the brake lining. This results in the risk that the operating reliability of the disk brake overall is reduced. However, at least the service life of the brake lining is reduced on account of undesired wear effects.

To remedy this, the thickness of the lining carrier plate is dimensioned in such a way that the lining carrier plate has sufficient rigidity.

Since, however, there is only a limited amount of space for the brake linings in the brake caliper of the disk brake, the loading-optimized dimensioning of the lining carrier plate is at the cost of the optimization of the friction lining volume. This is opposed to the requirement, made to optimize the service life of a brake lining, to configure the friction lining to be as thick as possible, with the result that the exchange intervals can be extended in relation to the operating times.

To achieve an improved attachment of the friction lining and/or an increase in its shear strength with respect to the lining carrier plate, it is known to provide the lining carrier plate with bumps on the side which faces the friction lining. However, they are not suitable to improve the flexural rigidity of the lining carrier plate, since the section modulus which is decisive for the flexural strength is not increased to the required extent.

At least one reinforcing rib may be provided outside the region of overlap of the friction lining. However, it is also conceivable to arrange the reinforcing rib in the region of overlap, the utilizable thickness of the friction lining being correspondingly restricted, however.

Precisely the thicker friction lining which is now possible produces advantages which result, in particular, from a longer service life of the brake lining, with the consequence that the repair and maintenance costs are reduced.

In principle, however, the thickness of the friction lining can also remain unchanged, as a result of which the weight of the brake lining is reduced overall, since the lining carrier plate still has the necessary thickness for the flexural rigidity only in the region which is subjected to particular loads.

The fact that non-uniform wear which, as depicted, has its cause in bending of the lining carrier plate is as it were ruled out contributes, in particular, to increasing the service life of the brake lining.

Moreover, the connection between the lining carrier plate and the friction lining is no longer loaded to the same extent as previously as a result of the behavior of the lining carrier plate which is now rigid, which in the past could even lead to stripping of the friction lining, with the resulting consequences principally with regard to the operating reliability.

This likewise applies to the no longer existing risk of the impermissible reduction of the air play which, as has already been mentioned, can lead to overheating of the brake lining. Overheating as a consequence of elastic springing back of the lining carrier plate is also avoided as a result of the reinforcement.

It is provided according to at least one disclosed embodiment to configure the at least one reinforcing rib by way of bending over of an edge region of the lining carrier plate which is produced from sheet metal, the edge region being arranged between two fastening eyelets of the lining carrier plate which serve to suspend the brake lining on an axial guide.

Bending over in the sense of angling away over a section which corresponds approximately to the spacing between the two fastening eyelets can be produced particularly simply. However, the reinforcing rib can also be produced by way of material-removing machining from a thicker lining carrier plate as starting material, the reinforcing rib being configured as a web between the two fastening eyelets or as a surface, including identically thick edges of the fastening eyelets, the region of overlap, that is to say the bearing face of the friction lining, then being correspondingly machined, that is to say recessed.

Particularly simple production results naturally when the lining carrier plate is composed of cast iron, it then being possible for the reinforcing rib to be cast, in whichever form.

The brake lining 1 consists of a lining carrier plate 3 and a friction lining 2 which is fastened thereon.

In the examples, the lining carrier plate 3 has at least one reinforcing rib 5 on its side which faces the friction lining 2. In principle, the opposite side can also be provided with reinforcing ribs.

To fasten the brake lining 1 in a brake caliper (not shown) of the disk brake, two fastening eyelets 4 which are arranged at a spacing from one another are provided in the lining carrier plate 3, which fastening eyelets 4 serve to receive guide bolts, for displacing the brake lining 1 in the direction of the brake disk.

In the design variant which is shown in FIG. 1, the bearing face of the lining carrier plate 3 for the friction lining 2 is stepped, that is to say lowered, in comparison with the remaining region of the lining carrier plate 3, with the result that the reinforcing rib 5 is formed in the remaining, adjacent region, in which reinforcing rib 5 the two fastening eyelets 4 are also made.

If the lining carrier plate 3 is composed of a sheet metal plate, the stepped surface can be formed with the removal of material. However, it is also conceivable to configure the lining carrier plate 3 as a cast part and to introduce the stepped formation during casting.

In the example which is shown in FIG. 2, the reinforcing rib 5 is formed by way of angling away of that edge region of the lining carrier plate 3 which is assigned to the fastening eyelets 4, the reinforcing rib 5 extending over virtually the entire spacing region between the fastening eyelets 4.

This is likewise the case in the brake lining 1 which is shown in FIG. 3. Here, the reinforcing rib 5 can be formed from solid material or can be formed when the lining carrier plate 3 is cast.

An edge which protrudes with respect to the lining carrier plate 3 ensures a sufficient guide area of the fastening eyelets 4, the height of which edge corresponds approximately to the height of the reinforcing rib 5.

The reinforcing ribs 5 which can be seen in FIGS. 2 and 3 are configured as straight lines. However, it is also conceivable to configure them in a different geometric shape, depending on the requirement, for example in an arcuate manner.

The invention claimed is:

1. A brake lining for a disk brake of a rail or utility vehicle, comprising a lining carrier plate, a friction lining which is fastened thereon, and two fastening eyelets extending through the lining carrier plate,
   wherein at least one reinforcing rib arranged between the two fastening eyelets with a uniform thickness greater than an adjoining region of the lining carrier plate is provided at least on that side of the lining carrier plate which faces the friction lining, and
   wherein the adjoining region of the lining carrier plate has a uniform thickness and is located between the at least one reinforcing rib and the friction lining on the lining side of the carrier.

2. The brake lining of claim 1, wherein the reinforcing rib is configured as a web which is arranged between the two fastening eyelets of the lining carrier plate; wherein the reinforcing rib is the same thickness as the fastening eyelets.

3. The brake lining of claim 1, wherein the lining carrier plate is composed of metal sheet or cast iron.

4. The brake lining of claim 1, wherein the reinforcing rib is configured as a straight line or an arc.

5. The brake lining of claim 1, wherein the reinforcing rib is arranged in the region of overlap of the friction lining or outside said region.

6. A brake lining for a disk brake of a rail or utility vehicle, comprising a lining carrier plate, a friction lining which is fastened thereon, and two fastening eyelets extending through the lining carrier plate, wherein at least one reinforcing rib is arranged between the two fastening eyelets, wherein the reinforcing rib is configured as an angled-away bent portion of an edge region of the lining carrier plate in a plane perpendicular to a longitudinal axis of the friction lining, wherein the plane intersects the two fastening eyelets.

7. A brake lining for a disk brake of a rail or utility vehicle, comprising:
   a lining carrier plate,
   a friction lining which is fastened on a bearing surface of the lining carrier plate, and
   two fastening eyelets extending through the lining carrier plate,
   wherein at least one reinforcing rib of uniform thickness extends between the two fastening eyelets, and
   wherein the bearing surface of the lining carrier plate for the friction lining is a stepped thickness that is uniformly thinner than the rest of the carrier plate.

* * * * *